United States Patent
Rho et al.

(10) Patent No.: US 9,804,408 B2
(45) Date of Patent: Oct. 31, 2017

(54) CAMERA LENS MODULE

(71) Applicant: Samsung Electronics Co., Ltd, Suwon-si (KR)

(72) Inventors: Hyung-Jin Rho, Seoul (KR); Se-Won Kim, Suwon-si (KR); Young-Bok Yu, Anyang-si (KR); Dong-Hun Yu, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 29 days.

(21) Appl. No.: 14/863,074

(22) Filed: Sep. 23, 2015

(65) Prior Publication Data

US 2016/0085086 A1   Mar. 24, 2016

(30) Foreign Application Priority Data

Sep. 23, 2014   (KR) .................. 10-2014-0126578

(51) Int. Cl.
  *G02B 27/64*   (2006.01)
  *G02B 7/09*   (2006.01)
  (Continued)

(52) U.S. Cl.
  CPC ............. *G02B 27/646* (2013.01); *G02B 7/08* (2013.01); *G02B 7/09* (2013.01); *G02B 13/001* (2013.01);
  (Continued)

(58) Field of Classification Search
  CPC .......... G02B 27/646; G02B 7/08; G02B 7/09; G02B 13/001; H04N 5/23248; H04N 5/23264; H04N 5/2251–5/2257
  See application file for complete search history.

(56) References Cited

U.S. PATENT DOCUMENTS 8,818,181 B1   8/2014 Hwang et al.
2011/0150442 A1*   6/2011 Ollila .................. H04N 5/2257
                                                         396/55
(Continued)

FOREIGN PATENT DOCUMENTS

EP   2743750   6/2014
KR   20120045333 A   5/2012
(Continued)

OTHER PUBLICATIONS

Extended European Search Report issued for EP 15186328.9 dated Jan. 25, 2016, 6 pgs.

*Primary Examiner* — Jason Flohre

(57) ABSTRACT

A camera lens module includes a lens unit, an automatic focus actuator including a first flexible circuit board. The first flexible circuit board has a plurality of first coil windings and a first Hall sensor. The plurality of first coil windings actuates the lens unit along an optical axis. An image stabilization actuator includes an image stabilization carrier having a plurality of magnets facing the first coil windings and a second flexible circuit board having a plurality of second coil windings facing respective lower surfaces of the magnets and a second Hall sensor. The camera lens module includes a base coupled with the image stabilization actuator under the image stabilization actuator, and a plurality of rollers disposed on the base and configured to rollably move the image stabilization actuator.

23 Claims, 7 Drawing Sheets

(51) Int. Cl.
*G02B 13/00* (2006.01)
*H04N 5/232* (2006.01)
*G02B 7/08* (2006.01)

(52) U.S. Cl.
CPC ..... *H04N 5/23248* (2013.01); *H04N 5/23264* (2013.01)

(56) References Cited

U.S. PATENT DOCUMENTS

| | | | |
|---|---|---|---|
| 2011/0286099 A1 | 11/2011 | Shiraki et al. | |
| 2012/0154614 A1* | 6/2012 | Moriya | H04N 5/2257 348/208.5 |
| 2013/0016427 A1 | 1/2013 | Sugawara | |
| 2014/0009631 A1* | 1/2014 | Topliss | H04N 5/2257 348/208.11 |
| 2014/0177056 A1* | 6/2014 | Hayashi | H04N 5/225 359/557 |
| 2015/0022891 A1* | 1/2015 | Hu | G02B 7/08 359/557 |
| 2015/0277140 A1* | 10/2015 | Minamisawa | G02B 7/023 359/557 |
| 2015/0365568 A1* | 12/2015 | Topliss | H04N 5/2251 348/360 |
| 2016/0154249 A1* | 6/2016 | Yeo | H04N 5/2257 359/557 |

FOREIGN PATENT DOCUMENTS

| | | |
|---|---|---|
| KR | 20120097117 A | 9/2012 |
| KR | 20140003716 A | 1/2014 |
| KR | 20140144126 A | 12/2014 |
| WO | WO 2013/121788 | 8/2013 |

\* cited by examiner

CAMERA LENS MODULE

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Sep. 23, 2014 and assigned Serial No. 10-2014-0126578, the entire disclosure of which is incorporated herein by reference.

TECHNICAL FIELD

Embodiments of the present disclosure are directed to camera lens modules for portable electronic devices.

BACKGROUND

A recent trend in the mobile phone industry is to equip one or more camera modules in the phone, and this camera type is called "camera-enabled phone" or "camera phone." Camera phones come with various functions mimicking those of high-end digital cameras (e.g., digital single-lens reflex (DSLR)), one representative example of which is image stabilization (so-called "anti-shake").

Conventional anti-shaking techniques for mobile phones do not provide satisfactory achievements in light of the size and number of actuators and accuracy of control.

For autofocusing and image stabilization, existing image stabilization devices adopt a non-feedback, open-loop control system that cannot obtain a more accurate or more adaptive control, posing limitations on quick or phase detection autofocusing.

Open-loop control is not a good choice for use in autofocusing actuators or image stabilization devices of camera lens modules because it cannot steadily measure the current flowing through coil windings and the movement of magnets in the autofocusing actuators and image stabilization devices. This leads to a need for an alternative.

A conventional anti-shake camera lens module is equipped with a separate set of magnets and coil windings for its autofocusing actuator and anti-shake actuator each, thus making it bulky.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a camera lens module includes first and second Hall sensors that are respectively disposed on first and second flexible circuit boards to apply a current to coil windings while measuring the moved position of magnets for autofocusing (AF) and optical image stabilization (OIS). Accordingly, the camera lens module can be quickly and accurately actuated in micrometers.

According to an embodiment of the present disclosure, a camera lens module includes a set of magnets that is used for both autofocusing (AF) and optical image stabilization (OIS). Accordingly, the camera lens module is made slimmer and smaller.

According to an embodiment of the present disclosure, a camera lens module includes a plurality of yokes respectively corresponding to magnets on a second flexible circuit board. The lens unit of the camera lens module, when actuated, is centered to the optical axis by the yokes.

According to an embodiment of the present disclosure, a camera lens module includes a lens unit, an automatic focus actuator including a first flexible circuit board, the first flexible circuit board having a plurality of first coil windings and a first Hall sensor, the plurality of first coil windings actuating the lens unit along an optical axis, an image stabilization actuator including an image stabilization carrier having a plurality of magnets facing the first coil windings and a second flexible circuit board having a plurality of second coil windings facing respective lower surfaces of the magnets and a second Hall sensor, and a base coupled with the image stabilization actuator under the image stabilization actuator, a plurality of rollers disposed on the base and configured to rollably move the image stabilization actuator.

According to an embodiment of the present disclosure, a camera lens module includes a lens unit, a lens carrier, the lens unit positioned inside the lens carrier, a first flexible circuit board surrounding an outer surface of the lens carrier, the first flexible circuit board having a plurality of first coil windings and a first Hall sensor, an image stabilization carrier having a plurality of magnets facing the first coil windings, the lens carrier positioned inside the image stabilization carrier, a second flexible circuit board disposed under the image stabilization carrier, the second flexible circuit board including a plurality of second coil windings respectively facing respective lower surfaces of the magnets and a second Hall sensor, and a base coupled with the second flexible circuit board and the image stabilization carrier under the image stabilization carrier, at least one roller disposed on the base and able to support the image stabilization carrier.

According to an embodiment of the present disclosure, a camera lens module includes first and second Hall sensors that are respectively disposed on first and second flexible circuit boards to apply a current to coil windings while measuring the moved position of magnets for autofocusing (AF) and optical image stabilization (OIS). Accordingly, the 3-axis (X, Y, and Z) movement of the camera lens module can be quickly and accurately controlled in micrometers.

According to an embodiment of the present disclosure, a camera lens module includes a set of magnets that is used for both autofocusing (AF) and optical image stabilization (OIS). Accordingly, the camera lens module is made slimmer and smaller.

According to an embodiment of the present disclosure, a camera lens module includes a plurality of yokes respectively corresponding to magnets on a second flexible circuit board. The lens unit of the camera lens module, when actuated, is centered to the optical axis by the yokes.

According to an embodiment of the present disclosure, second coil windings are disposed on an upper surface of the second flexible circuit board, and second Hall sensors on a lower surface thereof. Accordingly, upon image stabilization, the second Hall sensors can be avoided from interference by leaking magnetic fields from the second coil windings, and may thus function well without errors.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
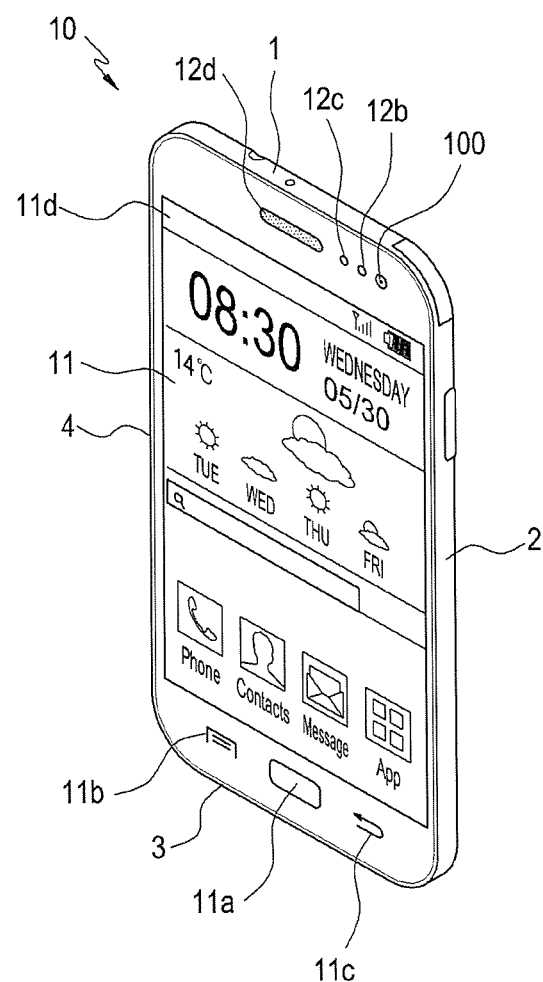
FIG. 1 is a front perspective view illustrating an electronic device according to an embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Definitions of terms as used herein are given, followed by a detailed description of embodiments of the present disclosure.

Typical terms being widely used in the art to which the present disclose pertains have been adopted herein for the purpose of description but may be varied depending on the intention of one of ordinary skill in the art, cases laws, or technologies. Some terms may be defined by the inventors in the detailed description. The terms used herein should be defined in the context of the embodiments as well as by their typical definitions.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure.

Described herein are camera lens modules equipped in electronic devices. According to an embodiment of the present disclosure, the electronic devices includes all mobile communication terminals operated as per communication protocols corresponding to various communication systems, video phones, e-book readers, laptop computers, netbook computers, personal digital assistants (PDAs), portable multimedia players (PMPs), MPEG-1 audio layer-3 (MP3) players, mobile medical devices, cameras, wearable devices (e.g., head mounted devices (HMDs) or other electronic glasses, electronic clothing, electronic bracelets, electronic necklaces, electronic accessories, electronic tattoos, or smartwatches), all other information communication devices and multimedia devices, and other application devices.

According to an embodiment of the present disclosure, the electronic device is a smart home appliance with a communication function.

For example, examples of the smart home appliance include, but are not limited to, a television, a digital video disk (DVD) player, an audio player, a refrigerator, an air conditioner, a vacuum cleaner, an oven, a microwave oven, a washer, a drier, an air cleaner, a set-top box, a TV box (e.g., SAMSUNG HOMESYNC™, APPLE TV®, or GOOGLE TV®), a gaming console, an electronic dictionary, a camcorder, or an electronic picture frame.

According to an embodiment of the present disclosure, examples of the electronic device include, but are not limited to, various medical devices (e.g., magnetic resonance angiography (MRA) device, a magnetic resonance imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), avionics, or security devices.

According to various embodiments of the disclosure, examples of the electronic device include, but are not limited to, a piece of furniture with a communication function, part of a building/structure, an electronic board, an electronic signature receiving device, a projector, or various measurement devices (e.g., devices for measuring water, electricity, gas, or electromagnetic waves).

According to an embodiment of the present disclosure, the electronic device is one or a combination of the above-listed devices or appliances.

According to an embodiment of the present disclosure, the electronic device is a flexible device.

However, the electronic device is not limited to the above-listed devices or appliances.

Figure 2:
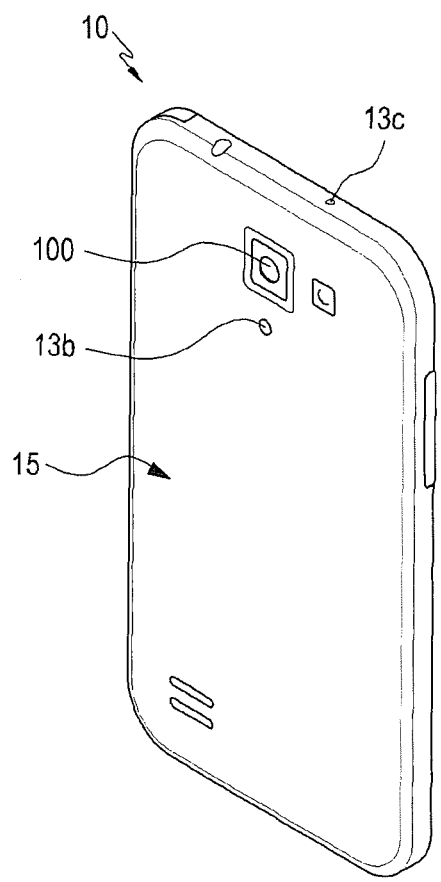
FIG. 2 is a rear perspective view illustrating an electronic device according to an embodiment of the present disclosure.

FIG. 1 is a front perspective view illustrating an electronic device according to an embodiment of the present disclosure. FIG. 2 is a rear perspective view illustrating an electronic device according to an embodiment of the present disclosure. The electronic device can be a smartphone or a tablet PC. A configuration of an electronic device is described with reference to FIGS. 1 and 2.

Referring to FIG. 1, the electronic device 10 has a touchscreen 11 on its front surface. The touchscreen 11 can take up substantially the overall front surface of the electronic device 10. A main home screen is displayed on the touchscreen 11. The main home screen shows up on the touchscreen 11 when the electronic device 10 powers on. The electronic device 10 provides a plurality of different home screens, and the main home screen is a first one of the home screens. On the home screen can be displayed various short key icons for executing frequently used applications, a back-to-main menu key, a time widget, and a weather widget. The back-to-main menu key, when touched or pressed, displays a menu on the touch screen 11. A status bar 11d is displayed on an upper portion of the touchscreen 11 to display statuses of the electronic device 10, such as remaining battery, strength of signal reception, and current time. A home key 11a, a menu button 11b, and a back button 11c is displayed on a lower portion of the touchscreen 11.

The home key 11a, which touched or pressed, displays the main home screen on the touchscreen 11. For example, when the home key 11a is touched with a home screen other than the main home screen displayed on the touchscreen 11, the main home screen is displayed on the touchscreen 11. When the home key 11a is touched while applications are in execution on the touchscreen 11, the main home screen is displayed on the touchscreen 11. The home key 11a is used to display recently used applications or a task manager on the touchscreen 11. The menu button 11b provides a connection menu available on the touchscreen 11. The connection menu includes an item for adding a widget, an item for background swapping, an item for searching, an item for editing, and an item for environment setup. The back button 11c, when touched or pressed, causes the touchscreen 11 to display a previous screen of the current screen or terminate the latest used application.

According to an embodiment of the present disclosure, the electronic device 10 includes a first camera lens module 100, an illumination sensor 12b, or a proximity sensor 12c in an upper area of the front surface thereof. The electronic device 10 includes a second camera lens module 100, a flash 13b, or a speaker 13c on a rear surface thereof. The electronic device 10 includes a removable battery pack, and in such case, the rear part of the electronic device 10 functions as a battery cover 15. As described and shown, the reference numeral "100" denotes the first camera lens module or the second camera lens module, and the first camera lens module and the second camera lens module is collectively referred to as a camera lens module.

The camera lens module 100 of the electronic device 10 is an image stabilization-equipped camera lens module, a VCM-type camera lens module, or an encoder-type camera lens module, but is not limited thereto as long as the camera lens module actuates a lens carrier by its actuator. For the purpose of description, the camera lens module 100 is an image stabilization-equipped camera lens module, a configuration of which is now described.

Figure 3:
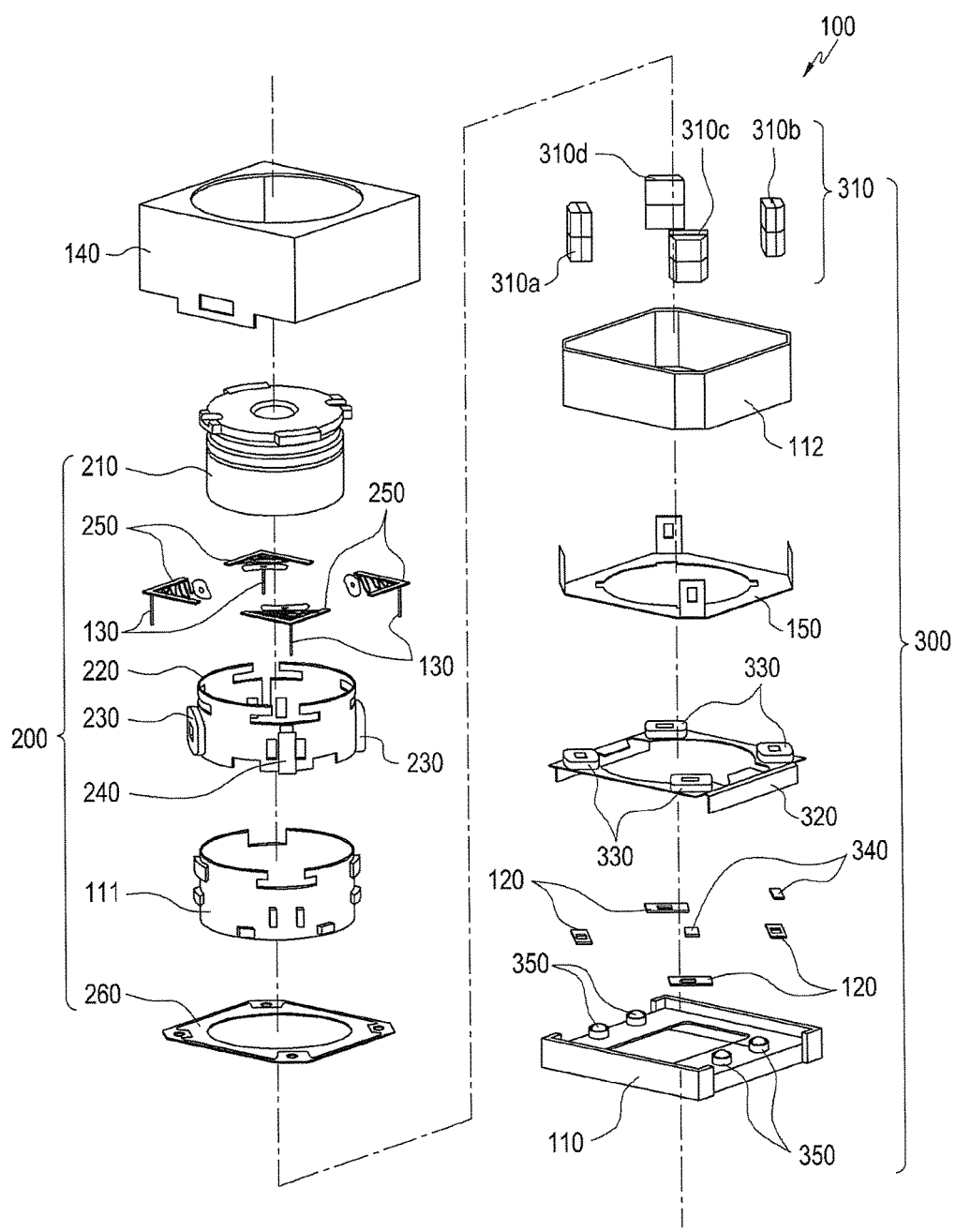
FIG. 3 is an exploded perspective view illustrating a configuration of a camera lens module according to an embodiment of the present disclosure.
Figure 4:
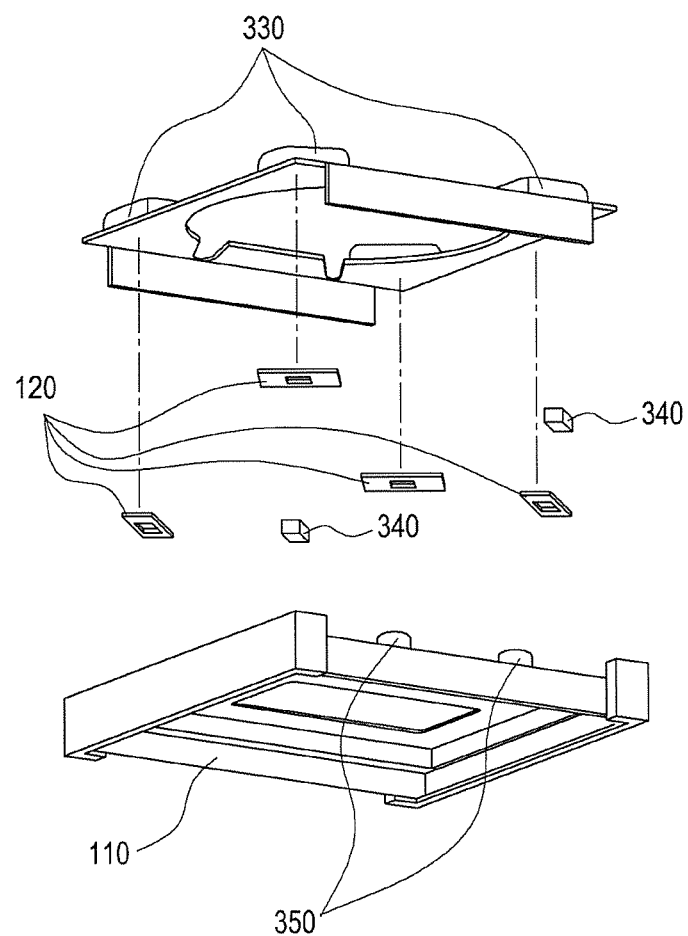
FIG. 4 is an exploded perspective view illustrating a plurality of yokes and a second Hall sensor of a camera lens module according to an embodiment of the present disclosure.
Figure 5:
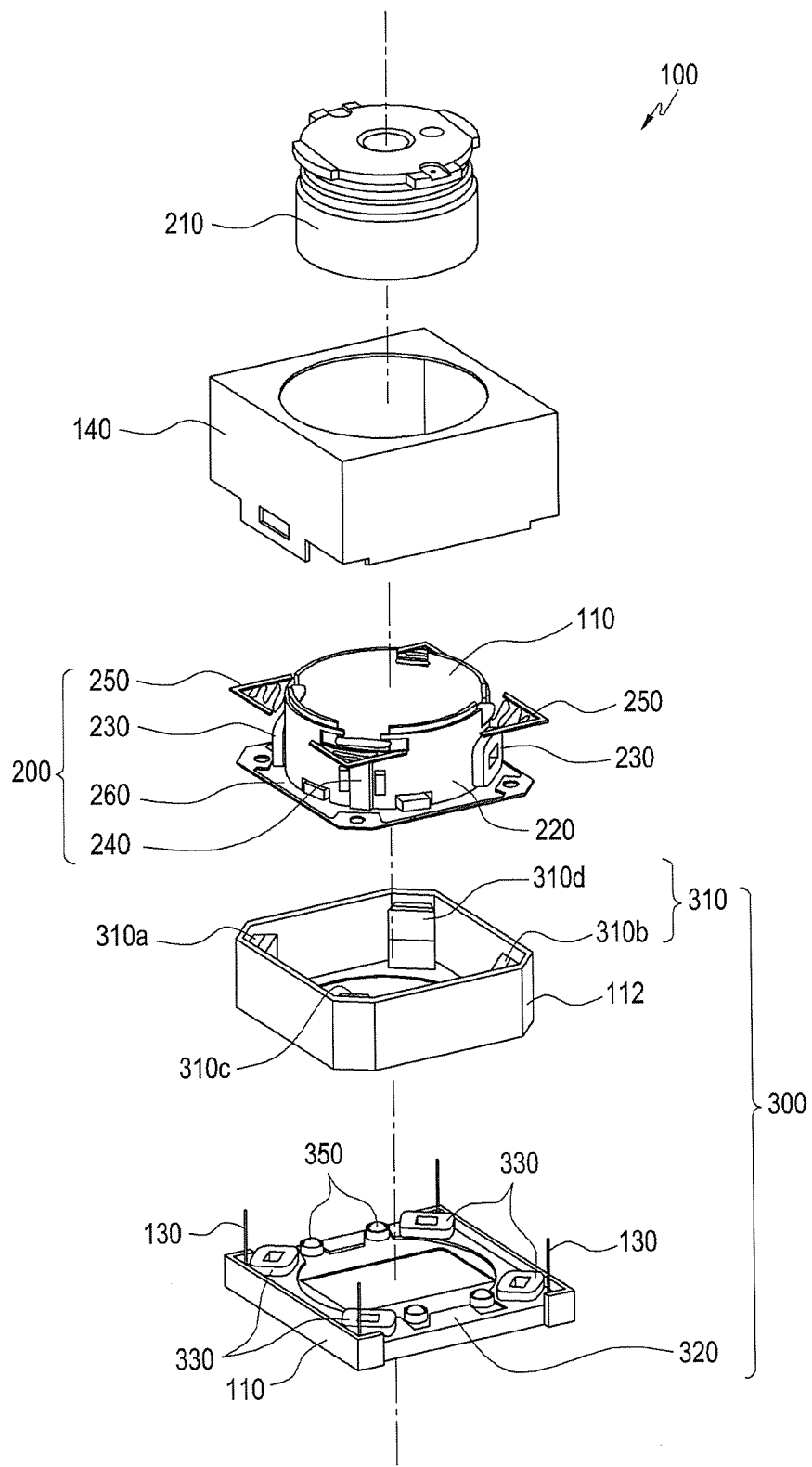
FIG. 5 is a perspective view illustrating a camera lens module in which a first flexible circuit board and a second flexible circuit board are assembled into each other according to an embodiment of the present disclosure.
Figure 6:
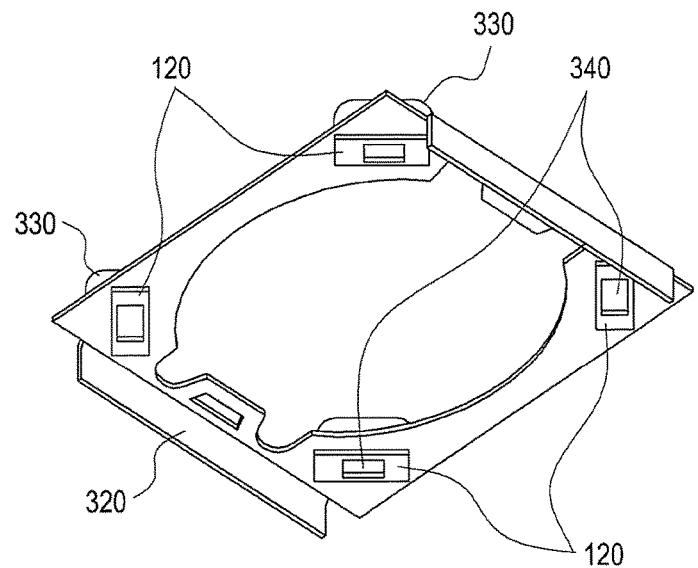
FIG. 6 is a perspective view illustrating a camera lens module in which a plurality of yokes and a second Hall sensor are assembled into a second flexible circuit board according to an embodiment of the present disclosure.

FIG. 3 is an exploded perspective view illustrating a configuration of a camera lens module according to an embodiment of the present disclosure. FIG. 4 is an exploded perspective view illustrating a plurality of yokes and a second Hall sensor of a camera lens module according to an embodiment of the present disclosure. FIG. 5 is a perspective view illustrating a camera lens module in which a first flexible circuit board and a second flexible circuit board are assembled into each other according to an embodiment of the present disclosure. FIG. 6 is a perspective view illustrating a camera lens module in which a plurality of yokes 120 and a second Hall sensor 240 are assembled into a second flexible circuit board 320 according to an embodiment of the present disclosure.

The camera lens module 100 is now described with reference to FIGS. 3 to 6. The camera lens module 100 includes a base 110, a lens unit 210, a lens carrier 111, a first flexible circuit board 220, a second flexible circuit board 320, an automatic focus actuator 200, an image stabilization carrier 112, and an image stabilization actuator 300.

The lens unit 210 is provided inside the lens carrier 111. The lens carrier 111 is provided on the base 110 through the image stabilization carrier 112, actuating the lens unit 210 in a direction of an optical axis (a Z axis).

The first flexible circuit board 220 has a plurality of first coil windings 230 and a first Hall sensor 240. Four magnets (a first magnet 310a, a second magnet 310b, a third magnet 310c, and a fourth magnet 310d) are positioned respectively at four inner corners, respectively, of the image stabilization carrier 112. The first flexible circuit board 220 is positioned to surround an outer surface of the lens carrier 111 so that the first coil windings 230 and the first Hall sensor 240 is positioned opposite the first, second, and third magnets 310a, 310b, and 310c, respectively. The number of the plurality of first coil windings 230 can be two.

For example, the two first coil windings 230 face the first and second magnets 310a and 310b, and the first Hall sensor 240 faces the third magnet 310c.

Further, a plurality of second coil windings 330, which is described below, is positioned opposite the first, second, third and fourth magnets 310a, 310b, 310c, and 310d, respectively.

A support plate 150 is provided under the image stabilization carrier 112 to fasten and support the first, second, third, and fourth magnets 310a, 310b, 310c, and 310d.

The second flexible circuit board 320 has the plurality of second coil windings 330 and second Hall sensors 340 positioned opposite respective lower surfaces of the first, second, third, and fourth magnets 310a, 310b, 310c, and 310d between the support plate 150 and the base 110.

For example, the second coil windings 330 are provided on an upper portion of the second flexible circuit board 320 to face respective lower surfaces of the first, second, third, and fourth magnets 310a, 310b, 310c, and 310d, and a plurality of yokes 120 and second Hall sensors 340 are provided on a lower portion of the second flexible circuit board 320 to face the respective lower surfaces of the first, second, third, and fourth magnets 310a, 310b, 310c, and 310d.

The second flexible circuit board 320 is coupled with an upper portion of the base 110 on which rollers 350 are provided to supportively actuate the image stabilization carrier 112 in a horizontal direction (X or Y direction) for image stabilization.

An image sensor-mounted printed circuit board (PCB, not shown) is provided under the base 110.

Two first coil windings 230 and a first Hall sensor 240 is positioned on an outer surface of the first flexible circuit board 220. The first Hall sensor 240 is positioned between the two first coil windings 230.

The first flexible circuit board 220 includes notches into which protrusions provided along the outer surface of the lens carrier 111 are fitted to enable a coupling between the first flexible circuit board 220 and the lens carrier 111.

As shown in FIGS. 3 and 4, the automatic focus actuator 200 is positioned between the lens carrier 111 and the image stabilization carrier 112 to enable the lens carrier 111 to move along the optical axis (Z axis). The automatic focus actuator 200 includes the lens unit 210, the first flexible circuit board 220, the two first coil windings 230, the first Hall sensor 240, and first and second restoration members 250 and 260. The lens unit 210 is provided inside the lens carrier 111 to be actuated along the optical axis (Z axis), together with the lens carrier 111. The first flexible circuit board 220 has the first Hall sensor 240 for applying a current to the two first coil windings 230 and detecting a moved position of the three magnets. The first flexible circuit board 220 is coupled with the lens carrier 111, surrounding the outer surface of the lens carrier 111.

The two first coil windings 230 are provided on the outer surface of the first flexible circuit board 220 in symmetry with each other with respect to the optical axis (Z axis), facing the first and second magnets 310a and 310b, respectively.

The first and second restoration members 250 and 260 are electrically connected with the first flexible circuit board 220 on an upper part and a lower part, respectively, of the first flexible circuit board 220 to provide elasticity that allows the lens carrier 111 to move along the optical axis (Z axis).

A plurality of wires 130 is provided between the first restoration member 250 and the second restoration member 260 to electrically connect the first flexible circuit board 220 with the second flexible circuit board 320.

The first restoration member 250 and the second restoration member 260, respectively, are provided on the upper and lower sides of the lens carrier 111 and the image stabilization carrier 112. The first restoration member 250 is split into four pieces, respectively, which are elastically connected, such as by soldering, with four upper edges of the lens carrier 111 and the image stabilization carrier 112. Alternatively, the first restoration member 250 is elastically connected with the lens carrier 111 and the image stabilization carrier 112 in other various ways (e.g., laser welding, thermal bonding, or surface mounted device (SMD) bonding)

As shown in FIGS. 5 and 6, the image stabilization actuator 300 is positioned between the image stabilization carrier 112 and the base 110 to compensate for shaking of the lens carrier 111 in a horizontal direction (X or Y direction). The image stabilization actuator 300 includes the first, second, third, and fourth magnets 310a, 310b, 310c, and 310d, the second flexible circuit board 320, the plurality of second coil windings 330, the second Hall sensors 340, and at least one roller 350. The first, second, third, and fourth magnets 310a, 310b, 310c, and 310d, respectively, is provided at inner corners of the image stabilization carrier 112 to face the second coil windings 330 respectively disposed at corners of the second flexible circuit board 320. The plurality of second coil windings 330 are disposed at corners of the upper surface of the second flexible circuit board 320, facing the first, second, third, and fourth magnets 310a, 310b, 310c, and 310d, respectively. The second Hall sensors 340 are disposed on the lower surface of the second flexible circuit board 320 to detect the moved position of the magnets in a horizontal direction (X or Y direction). The rollers 350 is provided on the upper surface of the base 110 to allow the image stabilization carrier 112 to rollably move in a direction (the X or Y axis) perpendicular to the optical axis (Z axis).

The rollers 350 include ball bearings that allow for rollable movement of the image stabilization carrier 112.

The plurality of yokes 120 are disposed on the lower surface of the second flexible circuit board 320, spaced apart from the respective lower portions of the first, second, third, and fourth magnets 310a, 310b, 310c, and 310d. The yokes 120 float the image stabilization carrier 112 over the base 110, centering the image stabilization carrier 112.

Figure 7:
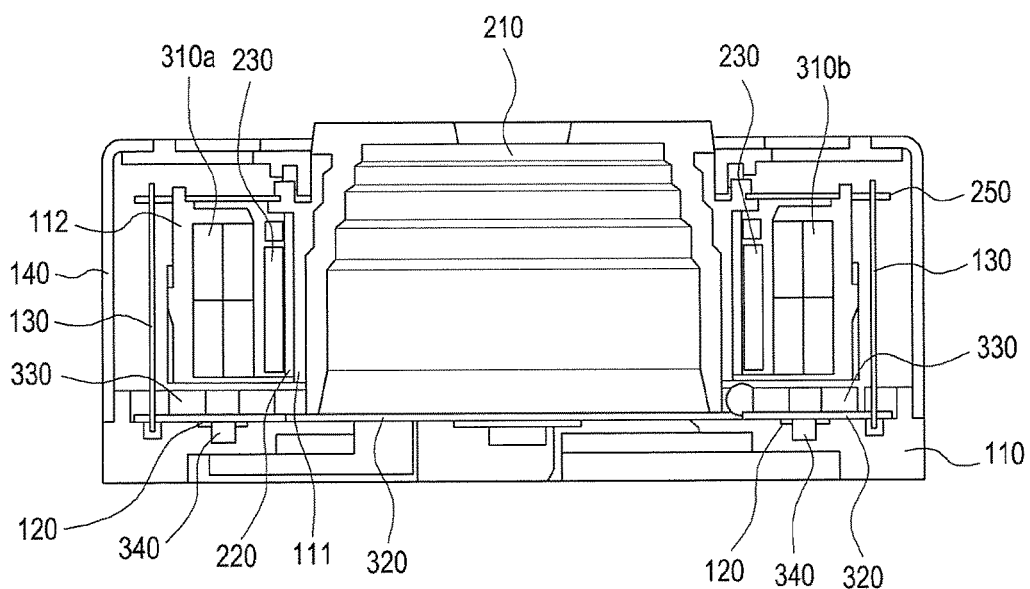
FIG. 7 is a side cross-sectional view illustrating an assembled camera lens module according to an embodiment of the present disclosure.
Figure 8:
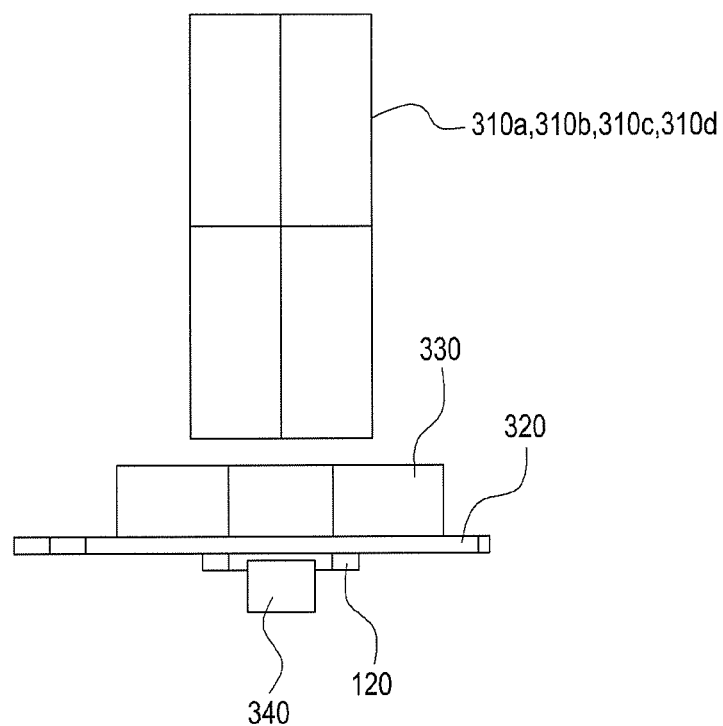
FIG. 8 is a side cross-sectional view illustrating an operation of a camera lens module according to an embodiment of the present disclosure.

As shown in FIGS. 7 and 8, the yokes 120, respectively, are disposed on the respective lower portions of the first, second, third, and fourth magnets 310a, 310b, 310c, and 310d, facing the first, second, third, and fourth magnets 310a, 310b, 310c, and 310d, preventing decentering of the image stabilization carrier 112 from the optical axis (Z axis) upon shaking compensation In other words, the image stabilization carrier 112 is separately "active-aligned" with the optical axis (Z axis). Here, "active alignment" is a technique that, after initial alignment of the camera lens module, places the image stabilization carrier 112 in alignment with the Z axis.

A cover 140 is coupled with the base 110. The cover 140 has a stopper (not shown) to restrict the movement of the lens carrier 111 along the optical axis (Z axis) while preventing the lens carrier 111 from moving off the optical axis (Z axis).

The configuration of the camera lens module is described in greater detail with reference to FIGS. 1 and 2.

As used herein, the "Z axis" refers to a vertical direction of the camera lens module and is the optical axis along which the lens carrier 111 moves. As used herein, the "X axis" refers to a first horizontal direction of the camera lens module, which is perpendicular to the optical axis, and the "Y axis" refers to a second horizontal direction of the camera lens module, which is perpendicular to the optical axis and the X axis. As described below, an automatic focus (AF) actuator provides a actuating force to allow the lens carrier 111 to move along the optical axis (Z axis) for focusing, and an optical image stabilizer (OIS) actuator provides a actuating force to actuate the image stabilization carrier 112 in the X and Y directions for horizontal balancing.

As such, the image stabilization carrier 112 has the first, second, third, and fourth magnets 310a, 310b, 310c, and 310d at four corners thereof, which jointly allow for auto-focusing and image stabilization. For example, autofocusing is achieved by the lower surfaces of the first, second, third, and fourth magnets 310a, 310b, 310c, and 310d, and image stabilization is achieved by the first and second magnets 310a and 310b. This eliminates the need of separate magnet sets respectively for autofocusing and image stabilization, thus slimming down the camera lens module.

Assembly of a camera lens module is now described with reference to FIGS. 1 to 6.

Referring to FIG. 3, the lens unit 210 is placed inside the lens carrier 111, and the first flexible circuit board 220 with the two first coil windings 230 and the first Hall sensor 240 is coupled to surround an outer surface of the lens carrier 111. The four pieces of the first restoration member 250 is electrically connected with an upper portion of the first flexible circuit board 220 by soldering, and the second restoration member 260 is electrically connected with a lower portion of the first flexible circuit board 220 by soldering. The plurality of wires 130 are provided between the first restoration member 250 and the second restoration member 260 to electrically connect the first flexible circuit board 220 with the second flexible circuit board 320.

The first, second, third, and fourth magnets 310a, 310b, 310c, and 310d are provided at four inner corners of the image stabilization carrier 112, and the support plate 150 is provided under the image stabilization carrier 112 to support the first, second, third, and fourth magnets 310a, 310b, 310c, and 310d.

The lens carrier 111 thusly assembled is fitted into the inside of the image stabilization carrier 112.

The first coil windings 230 of the first flexible circuit board 220, which are disposed on the outer surface of the lens carrier 111 face the first and second magnets 310a and 310b, respectively, and the first Hall sensor 240 of the first flexible circuit board 220 faces the third magnet 310c.

The second flexible circuit board 320 with the four second coil windings 330 and two second Hall sensors 340 are provided on the base 110. The rollers 350 are provided on an upper surface of the base 110.

The base 110 is placed under the image stabilization carrier 112, with the lens carrier 111 assembled in the image stabilization carrier 112. The rollers 350 abuts against the support plate 150 under the image stabilization carrier 112, allowing for a rollable movement of the image stabilization carrier 112. The respective lower surfaces of the first, second, third, and fourth magnets 310a, 310b, 310c, and 310d, which are respectively provided at the four inner corners of the image stabilization carrier 112, are respectively spaced apart from the four second coil windings 330 provided on the base 110.

The plurality of yokes 120 are provided under the second flexible circuit board 320, corresponding to the first, second, third, and fourth magnets 310a, 310b, 310c, and 310d, respectively. When the image stabilization carrier 112 is coupled with the base 110, the image stabilization carrier 112 is floated over the base 110 by magnetic interaction between the yokes and the magnets.

Now described is an operation of a camera lens module with reference to FIGS. 7 and 8, according to an embodiment of the present disclosure.

FIG. 7 is a side cross-sectional view illustrating an assembled camera lens module according to an embodiment of the present disclosure. FIG. 8 is a side cross-sectional view illustrating an operation of a camera lens module according to an embodiment of the present disclosure.

Referring to FIGS. 7 and 8, the automatic focus actuator 200 is disposed between the lens carrier 111 and the image stabilization carrier 112 to move the lens unit 210 along the optical axis (Z axis). The automatic focus actuator 200 includes the first flexible circuit board 220 coupled to surround an outer surface of the lens carrier 111. The first flexible circuit board 220 includes the two first coil windings 230 facing the first and second magnets 310a and 310b disposed in the image stabilization carrier 112 and the first Hall sensor 240 facing the third magnet 310c disposed in the image stabilization carrier 112. When a current is applied to the first coil windings 230, an electromagnetic force is generated between the first coil windings 230 and the first and second magnets 310a and 310b, moving the lens carrier 111 along the optical axis (Z axis) and automatically adjusting the focal distance between the lens unit and an image sensor (not shown). The first Hall sensor 240 detects the position of the third magnet 310c that is moved as the image stabilization carrier 112 is actuated.

In other words, the first flexible circuit board 220 is configured with the two first coil windings 230 and the first Hall sensor 240 that measures Gauss values and feedback values of the first, second, and third magnets 310a, 310b, and 310c so as to actuate the automatic focus actuator 200 including the lens unit 210, thus enabling precise control of autofocusing with a closed loop.

The four second coil windings 330 are provided on the second flexible circuit board 320, respectively facing the first, second, third, and fourth magnets 310a, 310b, 310c, and 310d provided under the image stabilization carrier 112. When a current is applied to the second coil windings 330, an electromagnetic force is generated between the magnets and the second coil windings 330 to provide a actuating force for the image stabilization carrier 112 to compensate for horizontal (X or Y directional) shaking. The second Hall sensors 340 are provided under the second flexible circuit board 320 to apply a current to the second coil windings 330 and to detect the moved position of the first, second, third, and fourth magnets 310a, 310b, 310c, and 310d.

The second coil windings 330 are provided for horizontal (X or Y directional) shaking compensation under the first, second, third, and fourth magnets 310a, 310b, 310c, and 310d, respectively, of the image stabilization carrier 112. The second coil windings 330 and the first, second, third, and fourth magnets 310a, 310b, 310c, and 310d interact to generate an electromagnetic force, allowing the magnets to be moved for horizontal (X or Y directional) shaking compensation. Such movement of the magnets is detected by the second Hall sensors 340. The second Hall sensors 340 are disposed on a lower surface of the second flexible circuit board 320, which is an opposite side of the upper surface of the second flexible circuit board 320 where the second coil windings 330 are disposed, thus minimizing interference caused by magnetic fields leaking from the second coil windings 330. Accordingly, when the image stabilization carrier 112 is actuated to compensate for horizontal (X or Y directional) shaking, Gauss values of the first, second, third, and fourth magnets 310a, 310b, 310c, and 310d is measured and closed-loop controlled, allowing for precise control.

The closed loop control enables output adjustment by steadily measuring errors between Gauss values and feedback values for the first, second, third, and fourth magnets 310a, 310b, 310c, and 310d and the second coil windings 330, which cannot be done by existing open-loop control.

According to an embodiment of the present disclosure, at least one roller 350, which includes a ball bearing, is disposed on an upper surface of the base 110 to rollably move the image stabilization carrier 112 over the base 110 when actuating the image stabilization carrier 112 in a horizontal direction (X or Y direction), allowing for easier actuation of the image stabilization carrier 112.

The plurality of yokes 120 are disposed under the second flexible circuit board 320, respectively corresponding to the first, second, third, and fourth magnets 310a, 310b, 310c, and 310d that are disposed at four corners of the second flexible circuit board 320 with respect to the optical axis (Z axis). When the image stabilization carrier 112 is actuated by an electromagnetic force between the magnets and the current-applied second coil windings 330, the magnets (and accordingly the image stabilization carrier 112) can return to their original positions and the image stabilization carrier 112 is prevented from rotating by interaction between the magnets and the yokes 120.

Thus, the image stabilization carrier 112 is easily centered by an electromagnetic force generated by interaction between the magnets and the yokes 120.

The stopper (not shown) attached to the cover 140 can prevent the image stabilization carrier 112 from deviating from the optical axis (Z axis), while restricting the movement of the lens carrier along the optical axis (Z axis).

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A camera lens module, comprising:
   a lens unit;
   an automatic focus actuator including a first flexible circuit board, the first flexible circuit board having a plurality of first coil windings and a first Hall sensor, the plurality of first coil windings actuating the lens unit along an optical axis;
   an image stabilization actuator including an image stabilization carrier having a plurality of magnets facing the plurality of first coil windings and a second flexible circuit board having a plurality of second coil windings facing respective lower surfaces of the plurality of magnets and a second Hall sensor;
   a base coupled with the image stabilization actuator and disposed beneath the image stabilization actuator; and
   a plurality of rollers disposed on the base and configured to rollably move the image stabilization actuator.

2. The camera lens module of claim 1, wherein the plurality of second coil windings are disposed on an upper surface of the second flexible circuit board, and wherein a plurality of yokes are disposed on a lower surface of the second flexible circuit board, the plurality of yokes respectively corresponding to the plurality of magnets, and the plurality of yokes configured to float and center the image stabilization carrier over the base.

3. The camera lens module of claim 1, wherein each of the plurality of rollers includes a ball bearing configured to rollably move the image stabilization actuator in a direction substantially perpendicular to the optical axis.

4. A camera lens module, comprising:
   a lens carrier;
   a lens unit disposed inside the lens carrier;
   a first flexible circuit board surrounding an outer surface of the lens carrier, the first flexible circuit board having a plurality of first coil windings and a first Hall sensor;
   an image stabilization carrier having a plurality of magnets facing the plurality of first coil windings, the lens carrier disposed inside the image stabilization carrier;
   a second flexible circuit board disposed beneath the image stabilization carrier, the second flexible circuit board including a plurality of second coil windings respectively facing respective lower surfaces of the magnets and a second Hall sensor; and
   a base coupled with the second flexible circuit board and the image stabilization carrier beneath the image stabilization carrier, at least one roller disposed on the base and configured to support the image stabilization carrier.

5. The camera lens module of claim 4, wherein an automatic focus actuator is disposed between the lens carrier and the image stabilization carrier and configured to move the lens carrier along an optical axis.

6. The camera lens module of claim 5,
   wherein the automatic focus actuator comprises:
   the lens unit disposed inside the lens carrier;
   the first flexible circuit board adapted to surround the outer surface of the lens carrier, having the first Hall sensor configured to apply a current to the plurality of first coil windings, and configured to detect a moved position of the plurality of magnets;
   the plurality of first coil windings and the first Hall sensor disposed on a side surface of the first flexible circuit board and respectively facing the magnets; and
   a first restoration member and a second restoration member respectively disposed on an upper portion and a lower portion of the first flexible circuit board, electrically connected with the first flexible circuit board, and configured to provide an elastic force that moves the lens carrier along the optical axis.

7. The camera lens module of claim 4, wherein an image stabilization actuator is disposed between the image stabilization carrier and the base to compensate for shaking of the lens carrier.

8. The camera lens module of claim 7, wherein the image stabilization actuator comprises:
   the plurality of magnets respectively disposed at corners of the image stabilization carrier; and
   the second flexible circuit board coupled with the base over the base and having the second Hall sensor and configured to apply a current to the second coil windings respectively disposed at corners of the second flexible circuit board on an upper surface of the second flexible circuit board and detecting a moved position of the magnets;
   the plurality of second coil windings and the second Hall sensor respectively disposed at the corners of the second flexible circuit board, facing the plurality of magnets, respectively; and
   the at least one roller disposed on an upper surface of the base configured to rollably move the image stabilization carrier in a direction substantially perpendicular to a optical axis.

9. The camera lens module of claim 8, wherein the at least one roller includes a ball bearing.

10. The camera lens module of claim 4, wherein a plurality of yokes are disposed on a lower surface of the second flexible circuit board to be spaced apart from the plurality of magnets, respectively, the plurality of yokes configured to float and center the image stabilization carrier over the base.

11. The camera lens module of claim 6, wherein a plurality of wires are disposed between the first restoration member and the second restoration member to electrically connect the first flexible circuit board with the second flexible circuit board.

12. The camera lens module of claim 4, wherein a cover is coupled with the base over the base, the cover having a stopper to restrict a movement of the lens carrier along an optical axis.

13. The camera lens module of claim 4, wherein a support plate is disposed under the image stabilization carrier to fasten and support the plurality of magnets.

14. A portable device comprising:
   a processor;
   a display coupled to the processor; and
   a camera lens module coupled to the processor, the camera lens module comprising:
   a lens carrier;
   a lens unit disposed inside the lens carrier;
   a first flexible circuit board surrounding an outer surface of the lens carrier, the first flexible circuit board having a plurality of first coil windings and a first Hall sensor;
   an image stabilization carrier having a plurality of magnets facing the plurality of first coil windings, the lens carrier disposed inside the image stabilization carrier;
   a second flexible circuit board disposed beneath the image stabilization carrier, the second flexible circuit board including a plurality of second coil windings respectively facing respective lower surfaces of the magnets and a second Hall sensor; and a base coupled with the second flexible circuit board and the image stabilization carrier beneath the image stabilization carrier, at least one roller disposed on the base and configured to support the image stabilization carrier.

15. The portable device of claim 14, wherein an automatic focus actuator is disposed between the lens carrier and the image stabilization carrier and configured to move the lens carrier along an optical axis.

16. The portable device of claim 15,
wherein the automatic focus actuator comprises:
the lens unit disposed inside the lens carrier;
the first flexible circuit board adapted to surround the outer surface of the lens carrier, having the first Hall sensor configured to apply a current to the plurality of first coil windings, and configured to detect a moved position of the plurality of magnets;
the plurality of first coil windings and the first Hall sensor disposed on a side surface of the first flexible circuit board and respectively facing the magnets; and
a first restoration member and a second restoration member respectively disposed on an upper portion and a lower portion of the first flexible circuit board, electrically connected with the first flexible circuit board, and configured to provide an elastic force that moves the lens carrier along the optical axis.

17. The portable device of claim 14, wherein an image stabilization actuator is disposed between the image stabilization carrier and the base to compensate for shaking of the lens carrier.

18. The portable device of claim 17, wherein the image stabilization actuator comprises:
the plurality of magnets respectively disposed at corners of the image stabilization carrier; and
the second flexible circuit board coupled with the base over the base and having the second Hall sensor and configured to apply a current the second coil windings respectively disposed at corners of the second flexible circuit board on an upper surface of the second flexible circuit board and detecting a moved position of the magnets;
the plurality of second coil windings and the second Hall sensor respectively disposed at the corners of the second flexible circuit board, facing the plurality of magnets, respectively; and
the at least one roller disposed on an upper surface of the base configured to rollably move the image stabilization carrier in a direction substantially perpendicular to an optical axis.

19. The portable device of claim 18, wherein the at least one roller includes a ball bearing.

20. The portable device of claim 14, wherein a plurality of yokes are disposed on a lower surface of the second flexible circuit board to be spaced apart from the plurality of magnets, respectively, the plurality of yokes configured to float and center the image stabilization carrier over the base.

21. The portable device of claim 16, wherein a plurality of wires are disposed between the first restoration member and the second restoration member to electrically connect the first flexible circuit board with the second flexible circuit board.

22. The portable device of claim 14, wherein a cover is coupled with the base over the base, the cover having a stopper to restrict a movement of the lens carrier along an optical axis.

23. The portable device of claim 14, wherein a support plate is disposed under the image stabilization carrier to fasten and support the plurality of magnets.

* * * * *